April 9, 1963    H. E. HOLCOMB    3,084,427
FILTER UNIT
Original Filed Jan. 2, 1958    2 Sheets-Sheet 1
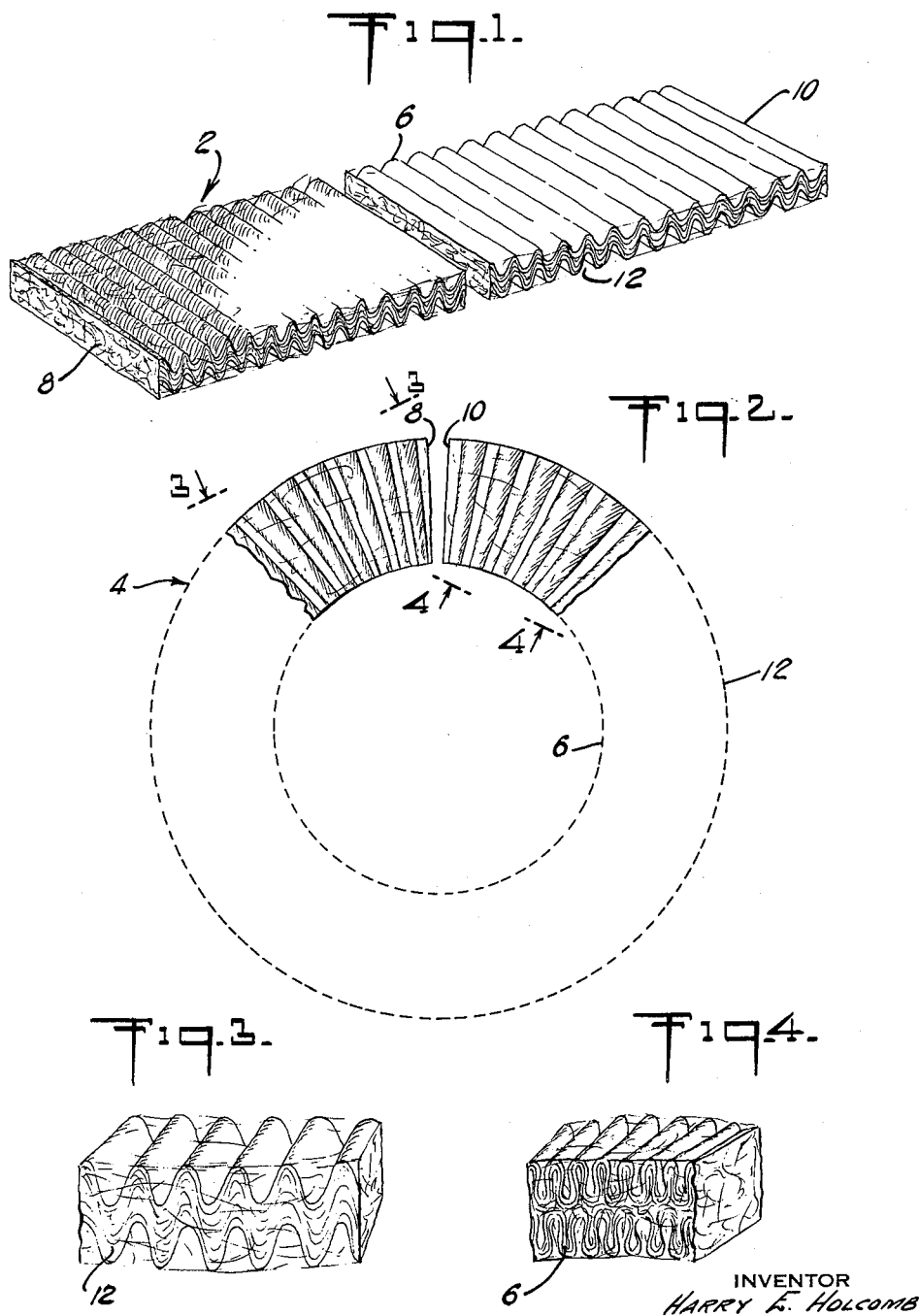
INVENTOR
HARRY E. HOLCOMB
BY
ATTORNEY April 9, 1963 H. E. HOLCOMB 3,084,427
FILTER UNIT
Original Filed Jan. 2, 1958 2 Sheets-Sheet 2

INVENTOR
HARRY E. HOLCOMB
BY
ATTORNEY

United States Patent Office 3,084,427
Patented Apr. 9, 1963

3,084,427
FILTER UNIT
Harry E. Holcomb, Stratford, Conn., assignor to Johns-Manville Corporation, New York, N.Y., a corporation of New York
Continuation of abandoned application Ser. No. 706,821, Jan. 2, 1958. This application Dec. 30, 1959, Ser. No. 680
2 Claims. (Cl. 29—419)

The present invention relates to fluid filter means and, more particularly, to a filter unit including disposable or so-called "throw-away" filter media. While the invention is primarily applicable to, and will be described in connection with, the field of air filtration it will be apparent that the apparatus may also be employed to filter liquids and other gases as well. This application is a continuation of application Serial No. 706,821 filed January 2, 1958, now abandoned.

In most hot air heating systems there is included a unit for filtering from the air, dust and other foreign matter. The filter units most widely employed consist of a rectangular fibrous pad 1 or 2" thick, supported in a paper or other frame across the path of air to be filtered, the direction of flow through the filter being in the direction of its thickness. The entire filter, including the frame, is ordinarily of the disposable type, although in recent years it has been proposed to utilize a relatively permanent frame capable of receiving disposable pads of filter media. In all such filters it has been recognized as desirable to employ a filter media having less fiber (being more open) adjacent the face through which air is received into the filter, and having more fiber (being less open) adjacent the face through which air is discharged from the filter, so that smaller dust particles will not be stopped until they have penetrated a substantial distance into the filter, whereby the filter will hold more dust and thus have a longer life before clogging and the resulting resistance to air flow necessitate its disposal. This variation in density, however, has been difficulty to attain, except to a limited degree, and even in filters where the principle has been employed, the filtering capacity (air volume which can be effectively filtered) leaves much to be desired.

A primary object of the present invention is to provide a fluid filter unit in which there is easily attained a greater variation in density from one face of the filter media to the other than in previous filters of the same general type.

A further object of the present invention is to provide a filter unit including disposable filter media capable of effectively filtering greater volumes of fluid than previous filters of this same general type.

Briefly, the above objects are attained in the present invention through the use of a filter pad made from a strip of fibrous filter media comprising a multiplicity of connected and substantially laminated layers of substantially continuous filaments. Each strip initially has a generally rectangular configuration with substantially parallel edge walls formed by the edges of said laminated layers and in the normal operation of the strip of fibrous filter media, the fluid to be filtered passes therethrough in planes extending generally perpendicularly to the planes of the broad surface areas of said strip of fibrous filter media. In accordance with the instant invention, the filter pad is formed by bending said strip of fibrous filter media around one longitudinal edge wall into a generally annular form so that said one longitudinal edge wall defines the inner periphery of the annulus, and the other of said longitudinal edge walls defines the outer periphery of the annulus so that said strip of fibrous filter media in said annular form is of increasing density from the outer periphery thereof to the inner periphery thereof and wherein said filter pad thus formed is composed of fibrous filter media comprising a multiplicity of connected and substantially laminated layers of said substantially continuous filaments. In the operation of the annular filter pad thus formed, the fluid to be filtered is passed through said annular filter pad in a generally radial and inward direction and in planes extending generally parallel to the planes of the broad surface areas of said layers. If desired, a number of such annular filter pads may be arranged to form a cylinder of fibrous filter media supported and confined in a frame in such a manner that fluid may be drawn through the fibrous filter media from the outside to the inside of the cylinder.

The invention will be more fully understood and further objects and advantages will become more apparent upon reference to the accompanying drawing in which:

FIG. 1 is a pictorial view of an elongated strip of filter media;

FIG. 2 is a plan view of a strip as shown in FIG. 1 formed into an annular section;

FIG. 3 is a pictorial view of a portion of the structure of FIG. 2 as viewed from plane 3—3;

FIG. 4 is a pictorial view of another portion of the structure of FIG. 2 as viewed from plane 4—4; and, FIG. 5 is an elevation, with parts broken away and parts in section, of a filter unit including a plurality of annular sections illustrated in FIG. 2.

Figure 5:
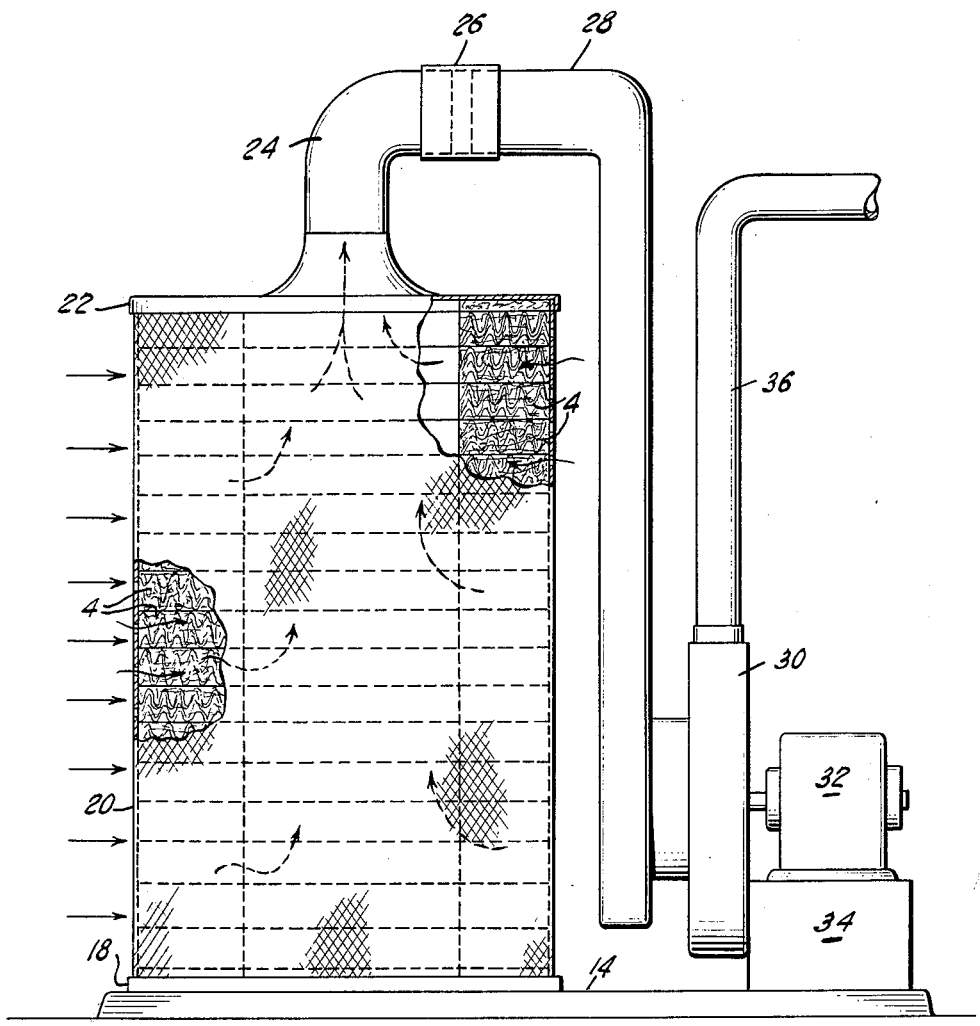

Referring to the drawing, there is shown in FIG. 1 an elongated strip of fibrous filter material, the material being preferably relatively uniform, and the strip preferably being substantially greater in width than the thickness. An example of material suitable for use in the present invention, and of which FIG. 1 is intended to be an illustration, is disclosed in United States Patent to Modigliani No. 2,546,230. Such material is composed of a plurality of layers of intercrossed filaments, with the filaments in each layer extending generally parallel but crossing filaments of adjacent layers at acute angles. The layers have a corrugated or undulatory form and are generally separate but tied together by a multiplicity of apparently randomly arranged portions of filaments In the normal use of filter pads of this nature the air or other fluid to be filtered, is normally passed through the filter pads in planes extending generally perpendicular to the broad surface areas of the layers of the filter pads. In the past, attempts to use the fibrous filter media wherein the air, or other fluid to be filtered, was passed through the fibrous filter media in planes extending generally parallel to the broad surface areas of the layers of fibrous filter media resulted in filter pads having no acceptable degree of filtering efficiency. As presently manufactured, such products are usually from ½ to 2" in thickness and range in density up to about 1 lb. per cubic foot. Strips of this material in ½, 1 and 2" thicknesses and ranging from 3 to 7" in width have been found entirely suitable for use in the present invention. It will be understood that the corrugated or undulatory character of the layers of filaments has been exaggerated in the drawings for purposes of illustration and that it is not necessary that this exact form of fibrous media be employed since any relatively uniform fibrous material having the size and quantity of fibers heretofore found suitable in the filtering field should function satisfactorily. Thus, while media having the corrugated or undulatory form has been found particularly suitable, other materials may also be employed.

In FIG. 2 the strip 2 illustrated in FIG. 1 has been formed into an annular section 4 by bending the strip around one lateral edge 6 until its ends 8 and 10 abut, whereby the edge 6 forms the inner periphery of the annulus and the edge 12 forms the outer periphery of the annulus. If desired, the ends 8 and 10 of the strip 2 may be secured together by any suitable method, one satisfactory method being by stapling. As will be noted below, when the frame of the present invention is employed, such securing of the ends 8 and 10 is not necessary and if desired the frame may be lined with one long strip arranged helically. The word "annulus" is intended to refer also to such a helical arrangement. The effect of bending the strip 2 around one lateral edge is illustrated in FIGS. 3 and 4 which show, respectively, the outer and inner peripheries of the annulus 4 The strip material 2 in the annular form allows a fluid to be passed through said annular pad so formed in planes extending generally perpendicular to the longitudinal axis of said annular filter pad or generally parallel to the broad surfaces areas of said strip 2. This direction of movement of the fluid to be filtered is completely different from the normal direction of movement of the fluid to be filtered through a rectangular strip 2 in normal operation. Thus, under normal operating conditions it is unexpected that a strip 2 of fibrous filter media would function effectively as a filter when the fluid to be filtered passes therethrough in directions generally parallel to the broad surface areas of the strip 2. It will be noted that in the outer periphery the fibrous structure is more open whereas in the inner periphery it is relatively compact. It is this degree of compactness that allows the filter media to perform efficiently as a filter pad with the fluid to be filtered passing therethrough in a generally radial and inward direction and generally parallel to the broad surface areas of the strip 2. Where media having the corrugated or undulatory form is employed, the corrugations extend radially of the annular section 4, and the corrugations, as well as the troughs between, are relatively wide at the outer periphery of the annulus and relatively narrow at the inner periphery. The degree of compactness at the inner periphery, and the degree of openness at the outer periphery obviously will vary with varying radii of the circles defined by such peripheries, and one of the principal advantages of the present invention is that it permits selection of that variation from the outer to the inner peripheries which is best suited for the particular conditions at hand Thus, by selecting a relatively small radius for the circle defined by the inner periphery in comparison with the width of the original strip 2, the annular section formed will be quite compact at the inner periphery and quite open at the outer periphery. The greater the radius of the circle defined by the inner periphery as compared with the width of the strip, the less will be the variation in density from the outer to the inner peripheries. It is this degree of compactness that allows the filter media to perform efficiently as a filter pad with the fluid to be filtered passing therethrough in a generally radial and inward direction and generally parallel to the broad surface areas of the strip 2. As indicated, the variation which is most suitable will depend upon the fluid to be filtered and its condition, and the factors affecting the proper selection are well known to those skilled in the art.

Referring now to FIG. 5, there is illustrated a base 14 resting upon the floor 16 of a chamber not completely illustrated. Positioned at one end of the base 14 is an annular ring 18 for receiving the lower end of a cylinder 20, preferably composed of a heavy wire mesh. The expanded metal customarily used for lath is an entirely suitable material for forming cylinder 20. Positioned over the upper end of the cylinder 20 is a cover 22 having an opening in the central portion thereof communicating with a pipe 24. Pipe 24 is connected by means of a coupling 26 to another pipe 28 communicating with a fan diagrammatically illustrated at 30 and driven by a motor 32 supported on a pedestal 34 at the other end of the base 14. The pipe 36 on the discharge side of the fan 30 is arranged to deliver filtered air for any desired purposes. One such common use of filtered air is in connection with hot air furnaces, in which case the discharge pipe 36 would lead into the air-intake side of the furnace. Of course, if desired the entire unit illustrated in FIG. 5, by suitable rearrangement of piping, could be housed within a furnace structure. To convert the unit just described into an effective filtering device, a plurality of annular sections 4 of filter media are arranged one atop the other within the cylinder 20. It will be apparent that if the length of the starting strips 2 of filter media is properly selected, the ends 8 and 10 of each strip may be caused to abut each other firmly when the strip is arranged in annular form within the cylinder 20. Of course, if desired the annular sections 4 may first be formed with the ends secured together and then inserted within the cylinder. When it is desired to insert or remove filter media from within the cylinder 20, it is only necessary to slide the coupling 26 to the right on the structure, as illustrated in FIG. 5, thus permitting removal of the cover 22 with its attached pipe 24. The annular sections 4 are then inserted or removed from the top of the cylinder, as desired.

During operation of the device of FIG. 5 it will be apparent from the arrows in the drawing that the fan 30 draws air from the outside to the inside of the cylindrical stack of annular sections 4 of air filter media, the filtered air then traveling from the space within the cylindrical stack of media through the pipes 24, 28 and 36 to the point of use. By reason of the fact that the filter media is more open adjacent the cylinder 20 than adjacent the inner surface of the cylindrical stack of media, the larger particles of foreign matter in the air being filtered are caught or stopped by the fibrous material at the outer portion of the cylindrical stack and the smaller particles are stopped more adjacent to the inner surface of the stack.

By use of the annular sections 4 of media arranged in a stack as shown, almost any desired volume of filter media having almost any desired range of variation in density from outer to inner surface may be attained. By reason of the fact that the variation in density of the media can be keyed to the type and condition of fluid being filtered, a filter unit composed in accordance with the invention can be utilized to attain a higher filtering capacity than can be attained with conventional filters. Also, greater flexibility in adaptation to various flow rates is possible.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method of making an annular filter unit comprising forming an annular filter pad from a strip of compressible fibrous filter media comprising a multiplicity of connected and substantially laminated layers of intercrossing substantially continuous filaments, said strip having a substantial thickness and initially a generally rectangular configuration and having substantially parallel longitudinal edge walls formed by the edges of said laminated layers so as to present relatively broad surface areas between said longitudinal edge walls, the method comprising, providing a strip of fibrous filter media having predetermined dimensions, bending said strip of fibrous filter media around one of said longitudinal edge walls into a generally annular form so that said one longitudinal edge wall defines the inner periphery of the annulus, and the other of said longitudinal edge walls defines the outer periphery of the annulus, said predetermined dimensions being such that said formed annular filter pad is of increasing density in a radial, inward direction, and positioning said annular filter pad so that the fluid to be filtered passes through said annular filter pad in a generally radial and inward direction in planes extending generally parallel to the planes of the broad surface areas of said strip.

2. A method of making a filter unit comprising forming a plurality of filter pads from strips of compressible fibrous filter media each comprising a multiplicity of connected and substantially laminated layers of intercrossing substantially continuous filaments, each of said strips having initially a generally rectangular configuration and having substantially parallel longitudinal edge walls formed by the edges of said laminated layers so as to present relatively broad surface areas between said longitudinal edge walls, the method comprising, providing a plurality of strips of fibrous filter media each having predetermined dimensions, bending each of said strips of fibrous filter media around one of said longitudinal edge walls into an annular form so that said one longitudinal edge wall defines the inner periphery of the annulus, and the other of said longitudinal edge walls defines the outer periphery of the annulus, said predetermined dimensions being such that said formed annular filter pad is of increasing density in a radial, inward direction, and stacking a plurality of said annular filter pads in said annular form to form said filter unit, and positioning said filter unit so that the fluid to be filtered passes through said filter unit in a generally radial and inward direction and in planes extending generally parallel to the planes of the board surface areas of said strips.

References Cited in the file of this patent

UNITED STATES PATENTS

| | | |
|---|---|---|
| 2,413,431 | Briggs | Dec. 31, 1946 |
| 2,421,204 | Kasten | June 3, 1947 |
| 2,546,230 | Modigliani | Mar. 27, 1951 |
| 2,670,851 | Curtis | Mar. 2, 1954 |
| 2,897,971 | Gewiss | Aug. 4, 1959 |

FOREIGN PATENTS

| | | |
|---|---|---|
| 1,010,267 | France | Mar. 19, 1952 |